US006231291B1

(12) United States Patent
Mueller et al.

(10) Patent No.: US 6,231,291 B1
(45) Date of Patent: May 15, 2001

(54) METHOD AND APPARATUS FOR EXCHANGING DATA CARTRIDGES IN A JUKEBOX DATA STORAGE SYSTEM

(75) Inventors: Robert L. Mueller; Paul C. Coffin, both of Fort Collins; Robert W. Luffel, Greeley, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/271,550

(22) Filed: Mar. 18, 1999

(51) Int. Cl.$^7$ .................................................. B65G 1/06
(52) U.S. Cl. .......................... 414/277; 414/280; 414/807
(58) Field of Search ................................. 414/277, 279, 414/280, 807; 360/92, 98.06; 369/178

(56) References Cited

U.S. PATENT DOCUMENTS

| 4,837,647 | 6/1989 | Nonaka et al. ........................ 360/92 |
| 4,998,232 | 3/1991 | Methlie et al. ........................ 769/36 |
| 5,001,582 | 3/1991 | Numasaki ........................ 360/98.06 |
| 5,010,536 | 4/1991 | Wanger et al. ........................ 369/36 |
| 5,014,255 | 5/1991 | Wanger et al. ........................ 369/36 |
| 5,036,503 | 7/1991 | Tomita ................................. 369/36 |
| 5,043,962 | 8/1991 | Wanger et al. ........................ 369/36 |
| 5,060,211 | 10/1991 | Blanding ............................... 369/36 |
| 5,064,337 | * 11/1991 | Asakawa et al. ................ 414/807 X |
| 5,101,387 | 3/1992 | Wanger et al. ........................ 369/36 |
| 5,128,912 | * 7/1992 | Hug et al. ............................... 369/38 |
| 5,278,708 | * 1/1994 | Apple et al. ........................... 360/92 |
| 5,427,489 | * 6/1995 | Chalmers et al. ...................... 414/277 |
| 5,429,470 | * 7/1995 | Nicol et al. ....................... 414/277 X |
| 5,544,146 | 8/1996 | Luffel et al. ......................... 369/178 |
| 5,596,556 | 1/1997 | Luffel et al. ........................... 369/36 |
| 5,638,349 | 6/1997 | Rugg et al. ............................. 369/36 |
| 5,682,096 | 10/1997 | Christie, Jr. et al. ............. 324/207.2 |
| 5,700,125 | * 12/1997 | Falace et al. ........................ 414/276 |
| 5,742,570 | * 4/1998 | Taki et al. .............................. 369/36 |
| 5,967,339 | * 10/1999 | Utsumi et al. ................... 414/277 X |
| 5,996,741 | * 12/1999 | Jones et al. ...................... 414/280 X |
| 6,027,296 | * 2/2000 | Meier ............................. 360/92 X |
| 6,059,509 | * 5/2000 | Ostwald ................................ 414/277 |
| 6,068,436 | * 5/2000 | Black et al. ......................... 414/277 |
| 6,088,189 | * 7/2000 | Utsumi et al. ......................... 360/92 |
| 6,104,693 | * 8/2000 | Coffin et al. ......................... 369/178 |
| 6,175,539 | * 1/2001 | Holmquist et al. .................. 369/178 |

FOREIGN PATENT DOCUMENTS

WO 85/02051    5/1985  (WO).

* cited by examiner

*Primary Examiner*—James W. Keenan (57) ABSTRACT

Data cartridge exchange apparatus for allowing a user to access a data cartridge contained in a data storage system may comprise a cartridge engaging assembly mounted within the data storage system so that the cartridge engaging assembly is moveable along a displacement path. A panel located adjacent a portion of the displacement path is provided with a cartridge exchange aperture therein that is sized to pass the data cartridge.

17 Claims, 6 Drawing Sheets

METHOD AND APPARATUS FOR EXCHANGING DATA CARTRIDGES IN A JUKEBOX DATA STORAGE SYSTEM

FIELD OF INVENTION

This invention relates generally to jukebox data storage systems and more specifically to data cartridge exchange systems for jukebox data storage systems.

BACKGROUND

Many different types of data storage systems exist and are being used to store data cartridges at known locations and to retrieve desired data cartridges so that data may be written to or read from the data cartridges. Such data storage systems are often referred to as "jukebox" data storage systems, particulary if they can accommodate a large number of individual data cartridges.

A typical jukebox data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are commonly arranged so that they form one or more vertical stacks, although other configurations are possible. The cartridge read/write device may be located at any convenient location within the data storage system.

The data storage system may also be provided with a cartridge handling system for transporting the data cartridges between the various cartridge receiving devices, e.g., between the cartridge storage racks and the cartridge read/write devices. A typical cartridge handling system may include a cartridge engaging assembly or "picker" for engaging the various data cartridges contained in the cartridge receiving devices, as well as a positioning device for moving the cartridge engaging assembly among the various cartridge receiving devices.

Jukebox data storage systems of the type described above are usually connected to a host computer system (not shown) which may access or store data on the data cartridges. For example, if the host computer system issues a request for data contained on a particular data cartridge, a control system associated with the data storage system actuates the positioning system to move the cartridge engaging assembly or picker along the cartridge storage racks until the cartridge engaging assembly is positioned adjacent the desired data cartridge. The cartridge engaging assembly may then remove the data cartridge from the cartridge storage rack and carry it to the cartridge read/write device. Once properly positioned adjacent the cartridge read/write device, the cartridge engaging assembly may insert the selected data cartridge into the cartridge read/write device so that the host computer may thereafter read data from or write data to the data cartridge. After the read/write operation is complete, the cartridge engaging assembly may remove the data cartridge from the cartridge read/write device and return it to the appropriate location in the cartridge storage rack.

It is often necessary or desirable for a system operator to periodically access one or more of the data cartridges contained within such a jukebox data storage system. For example, it may be necessary for the system operator to remove certain of the data cartridges from time to time if they become filled with data that is to be archived at another location. The system operator may then replace the filled data cartridges with blank data cartridges. In another situation, the system operator may desire to remove one or more of the data cartridges and replace it or them with a substitute data cartridge or cartridges containing different data.

In order to accommodate the foregoing needs, many jukebox data storage systems are provided with an access panel to allow the system operator to access to the data cartridges stored within the data storage system. While such an arrangement is usually effective from a functional standpoint, it is usually difficult and cumbersome to implement in practice. For example, since the access panel needs to be removed in order to access the data cartridges, the data storage system must be temporarily shut-down or suspended in order to prevent the cartridge handling system from interfering with the system operator's access to the cartridges and to prevent injury to the system operator should the cartridge engaging assembly move while the system operator's hand is inside the data storage system. Another difficulty is that it is often difficult for the system operator to locate the particular data cartridges that are to be replaced. Still another disadvantage is that once the access panel has been replaced, it is necessary for the data storage system to re-inventory all the data storage cartridges contained therein. Such re-inventory processes are time consuming and difficult to justify, particularly if only one cartridge has been replaced. Nevertheless, the data storage system must re-inventory the data cartridges before the data storage system can be returned to service.

Partly in an effort to solve some of the problems associated with the foregoing type of data cartridge exchange system, a data storage system has been developed that includes an extendable drawer that can be pulled open to allow a system operator to access the data cartridges stored in the data storage system. An example of such a system is shown and described in U.S. patent application Ser. No. 09/179,793 filed on Oct. 27, 1998 and entitled "Mail Slot Data Cartridge Exchange System For Use With A Data Storage System," which is incorporated herein by reference for all that it discloses. Such an extendable drawer is useful in that it allows a system operator to access a data cartridge without the need to remove a separate access panel. Consequently, this drawer type of data cartridge exchange system eliminates the need to temporarily suspend the operation of the data storage system while the system operator is accessing the data cartridges.

Unfortunately, the drawer type of data cartridge exchange system is not without its disadvantages. For example, the drawer represents the addition of additional structure and components that will generally add to the overall cost and complexity of the data storage system. Such increased cost can be a disadvantage, particularly for smaller jukebox data storage systems capable of storing only a handful of individual data cartridges.

SUMMARY OF THE INVENTION

Data cartridge exchange apparatus for allowing a user to access a data cartridge contained in a data storage system may comprise a cartridge engaging assembly mounted within the data storage system so that the cartridge engaging assembly is moveable along a displacement path. A panel located adjacent a portion of the displacement path is provided with a cartridge exchange aperture therein that is sized to pass the data cartridge.

Also disclosed is a method for accessing at least one data cartridge contained in a data storage system that comprises the steps of: Providing the data storage system with a cartridge engaging assembly that is moveable along a displacement path and a panel having a cartridge exchange aperture therein that is located adjacent a portion of the displacement path; moving the cartridge engaging assembly adjacent the cartridge exchange aperture; ejecting the data cartridge from the cartridge exchanging assembly; and removing the ejected data cartridge via the cartridge exchange aperture.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
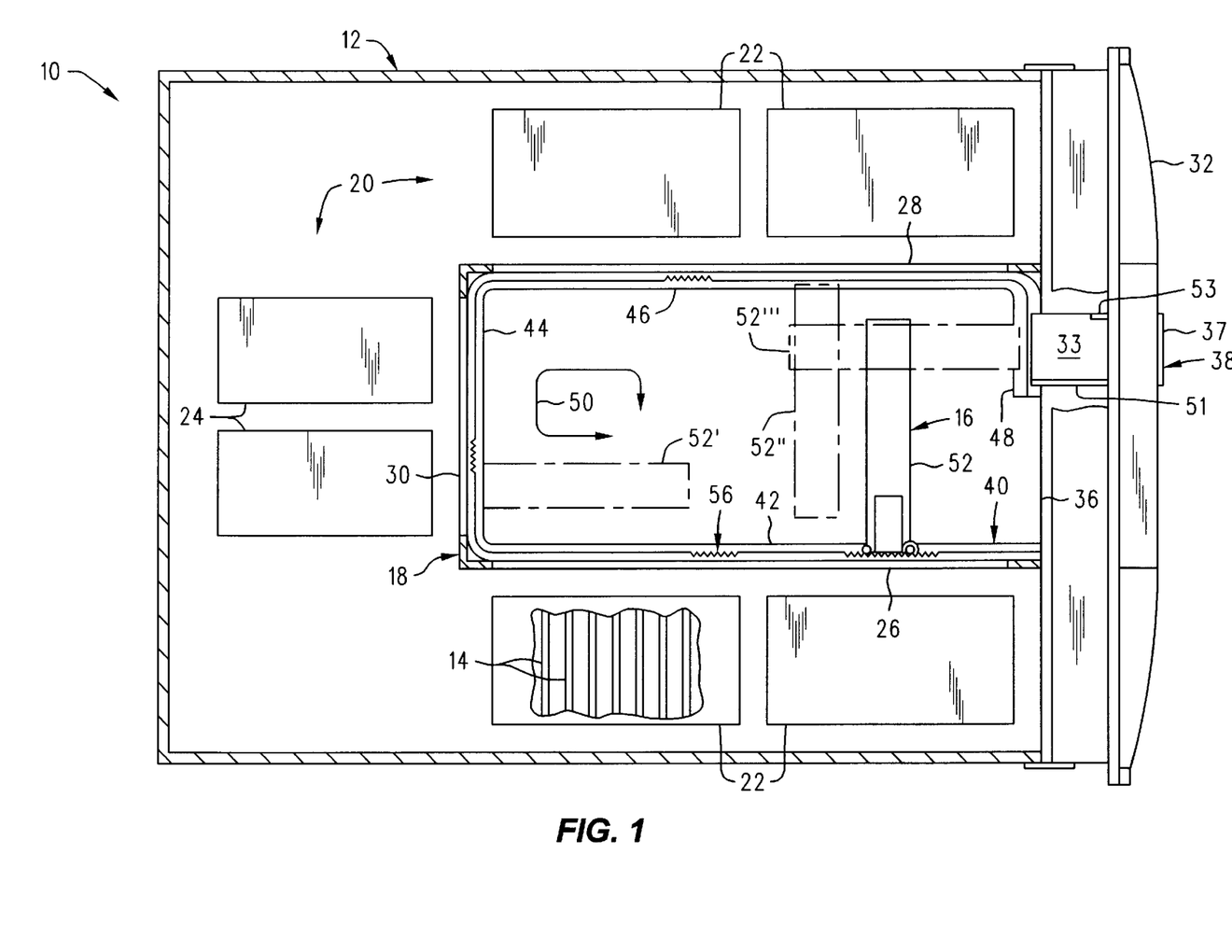
FIG. 1 is a plan view of a jukebox data storage system with the top panel removed to show the various components of the data cartridge exchange apparatus according to one embodiment of the present invention.

Data cartridge exchange apparatus 10 according to one embodiment of the present invention is shown in FIG. 1 as it could be used in a jukebox data storage system 12 of the type used to hold one or more data cartridges 14. The data cartridge exchange apparatus 10 allows at least one data cartridge 14 to be accessed by a system operator (not shown) during the operation of the jukebox data storage system 12. For example, a system operator (not shown) may use the data cartridge exchange apparatus 10 to withdraw a certain data cartridge 14 from the jukebox data storage system 12 and to replace it with a substitute data cartridge (not shown).

Figure 2:
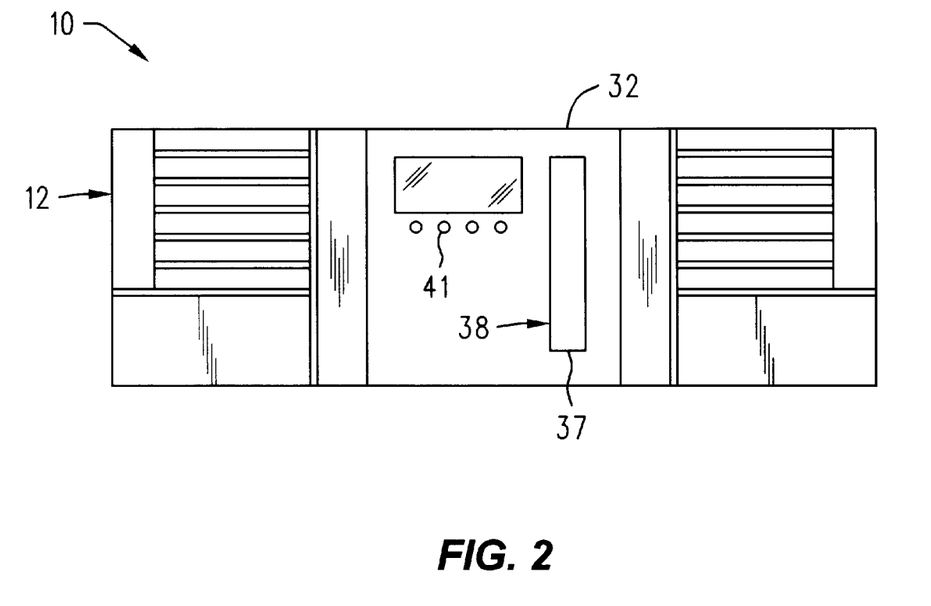
FIG. 2 is a front view in elevation of the front panel of the data cartridge exchange apparatus shown in FIG. 1.
Figure 3:
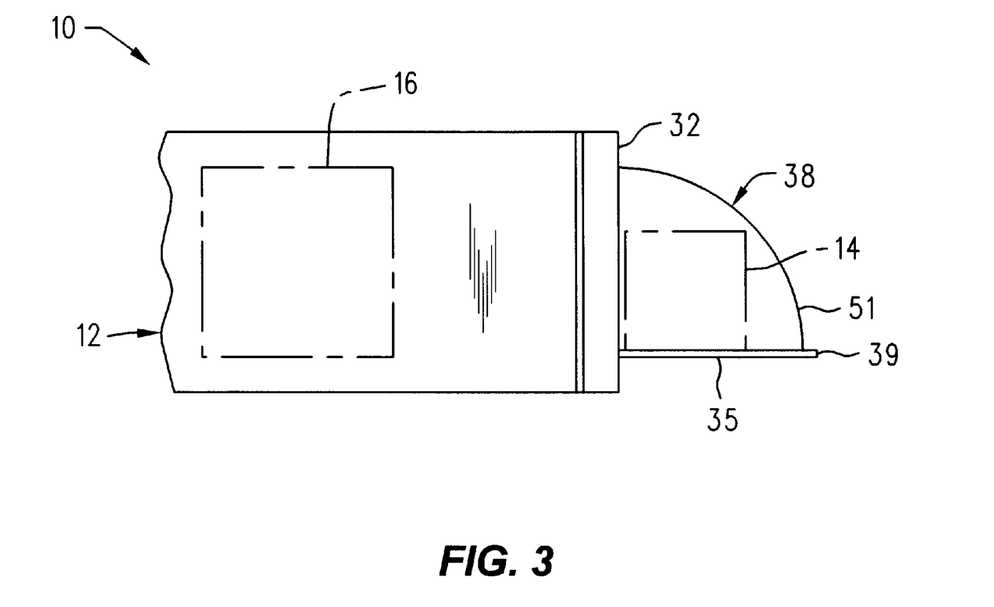
FIG. 3 is a side view in elevation of the jukebox data storage system with the cartridge exchange door in the opened position.

Referring now to FIGS. 1–3, the data cartridge exchange apparatus 10 utilized in one preferred embodiment of the present invention may comprise a cartridge engaging assembly or "picker" 16 that is moveably mounted to a generally rectangular guide frame or chassis assembly 18 contained within the jukebox data storage system 12. The cartridge engaging assembly or "picker" 16 may be used to store and retrieve the data cartridges 14 contained within the jukebox data storage system 12. The data cartridges 14 may be contained within one or more different types of cartridge receiving devices 20, such as one or more cartridge magazines 22 and one or more cartridge read/write devices 24. The various cartridge receiving devices 20 (e.g., the cartridge magazines 22 and the cartridge read/write devices 24) may be mounted around the rectangular guide frame or chassis assembly 18 so that they define a generally U-shaped configuration, although other configurations are possible. For example, in the embodiment shown and described herein, the cartridge magazines 22 may be mounted at positions adjacent either opposed side portion 26, 28 of the guide frame 18, whereas the cartridge read/write devices 24 may be mounted at positions adjacent the rear end portion 30 of guide frame 18.

The data cartridge exchange apparatus 10 may also be provided with a panel member 32 having a cartridge exchange aperture 34 (FIG. 4) therein so that the cartridge exchange aperture 34 is positioned adjacent the front end portion 36 of guide frame 18. See FIG. 1. As will be described in greater detail below, a cartridge exchange door 38 mounted to the panel 32 may be configured to receive a data cartridge 14 and to allow the data cartridge 14 to be removed via the cartridge exchange aperture 34 in the panel member 32. The cartridge exchange door 38 is hinged to the front panel member 32 and may be moved between a closed position 37 (FIGS. 1 and 2) and an opened position 39 (FIGS. 3 and 4) to allow a data cartridge 14 contained therein to be accessed by the system operator.

Still referring to FIG. 1, the guide frame assembly 18 may be provided with generally U-shaped guide member 40 located near the periphery of the guide frame assembly 18. As will be explained in greater detail below, the guide member 40 guides the cartridge engaging assembly 16 along a displacement path 50. The guide member 40 is contiguous is nature and includes first, second, and third working branches or sections 42, 44, and 46 positioned adjacent the first side portion 26, rear end portion 30, and second side portion 28, respectively, of guide frame assembly 18. Guide member 40 may also be provided with an exchange branch or section 48 located adjacent the front end portion 36 of frame assembly 18.

The cartridge engaging assembly or picker 16 is mounted to the guide member 40 and is thus guided by the guide member 40 along the displacement path 50 so that the cartridge engaging assembly 16 may access the data cartridges 14 contained in the various cartridge receiving devices 20. For example, the cartridge engaging assembly 16 may be moved between a first position 52 along the first side portion 26 of guide frame assembly 18, a second position 52' along the rear end portion 30, and a third position 52" along the second side portion 28 of guide frame assembly. The cartridge engaging assembly 16 may also be moved to a fourth position 52'" along the front end 36 of guide frame assembly 18. Of course, the cartridge engaging assembly 16 may be moved from a position along the front end 36 of frame assembly 18 to positions along the other sides (e.g., 28, 30, 26) of the frame assembly 18 by simply reversing the direction of travel of the cartridge engaging assembly 16.

Figure 5:
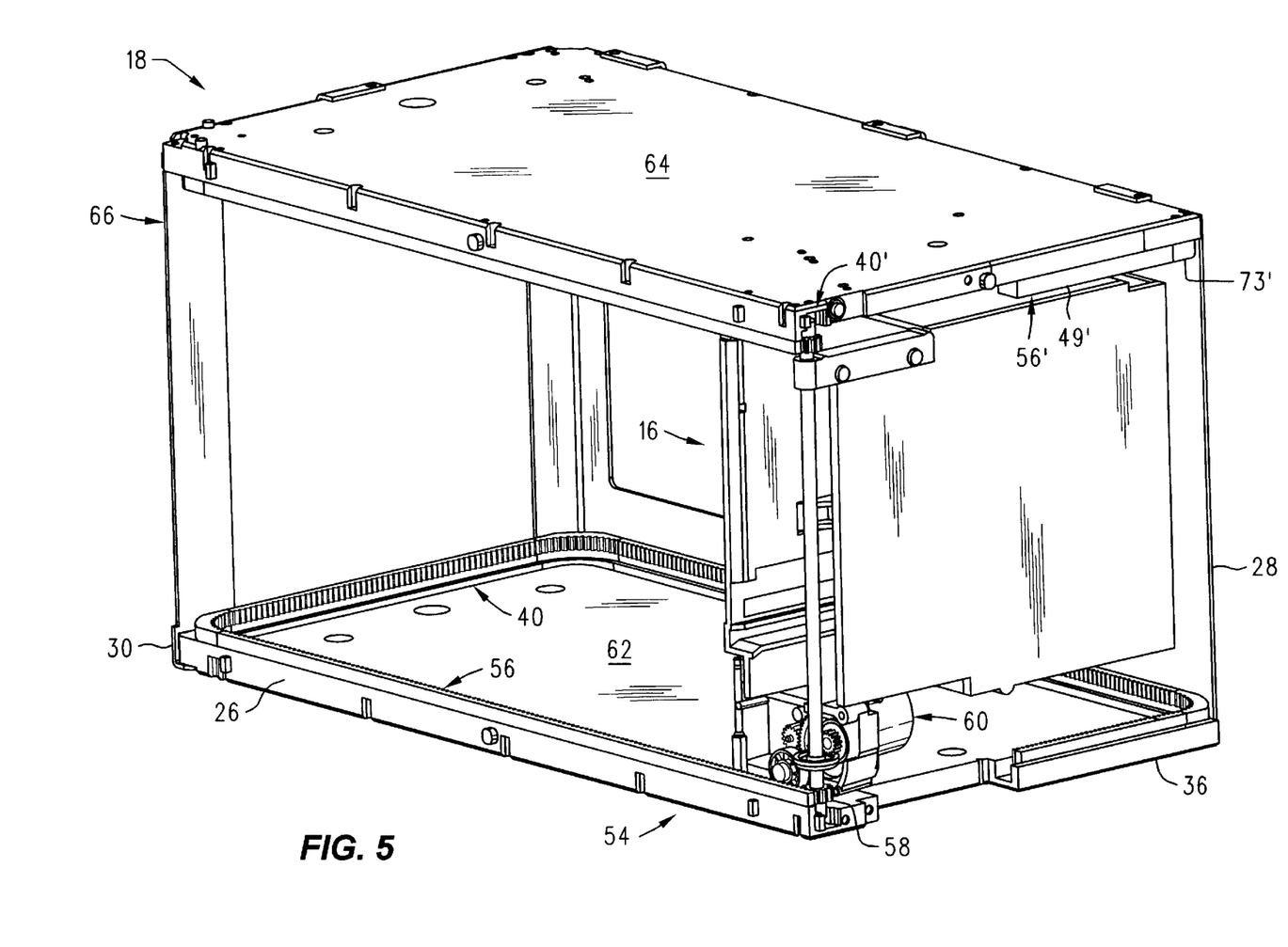
FIG. 5 is a perspective view of the guide frame assembly and cartridge engaging assembly that may be used in the data cartridge exchange apparatus shown in FIG. 1.

The cartridge engaging assembly 16 may be moved along the guide member 40 by an actuator system 54, as best seen in FIG. 5. In one preferred embodiment, the actuator system 54 may comprise a rack and pinion drive system having a substantially continuous gear rack 56 provided on the guide frame assembly 18 at a position adjacent the guide member 40. A drive pinion 58 mounted to the cartridge engaging assembly 16 engages the gear rack 56. A pinion drive assembly 60 mounted to the cartridge engaging assembly 16 rotates the drive pinion 58, thereby moving the cartridge engaging assembly 16 back and forth along the guide member 40, following the displacement path 50 (FIG. 1).

The data cartridge exchange apparatus 10 may be operated as follows to allow the system operator (not shown) to access a data cartridge 14 contained within the jukebox data storage system 12. Consider, for example, a situation wherein the data storage system 12 has been provided with a plurality of data cartridges 14. During normal operation, the cartridge exchange door 38 may remain in the fully closed position 37 (FIGS. 1 and 2), thereby allowing the cartridge engaging assembly 16 mounted within the jukebox data storage system 12 to access all of the data cartridges 14 contained therein. If the need then arises for the system operator to access a data cartridge 14, such as, for example, to remove the data cartridge 14 and replace it with a substitute data cartridge (not shown), the cartridge engaging assembly 16 may remove the selected data cartridge 14 from the cartridge receiving device 20 (i.e., a cartridge magazine 22 or a cartridge read/write device 24, as the case may be) and carry the selected data cartridge 14 to the cartridge exchange door 38. That is, the actuator system 54 will move the picker 16 along the displacement path 50 until the picker 16 is positioned opposite the cartridge exchange door 38, i.e., substantially at position 52'''. Once properly positioned, the picker 16 will eject the data cartridge 14, whereupon it will be received and held by the cartridge exchange door 38. Thereafter, the system operator may open the cartridge exchange door 38 to expose the data cartridge 14, allowing the same to be removed and/or replaced with a substitute data cartridge (not shown). See FIGS. 3 and 4.

Figure 4:
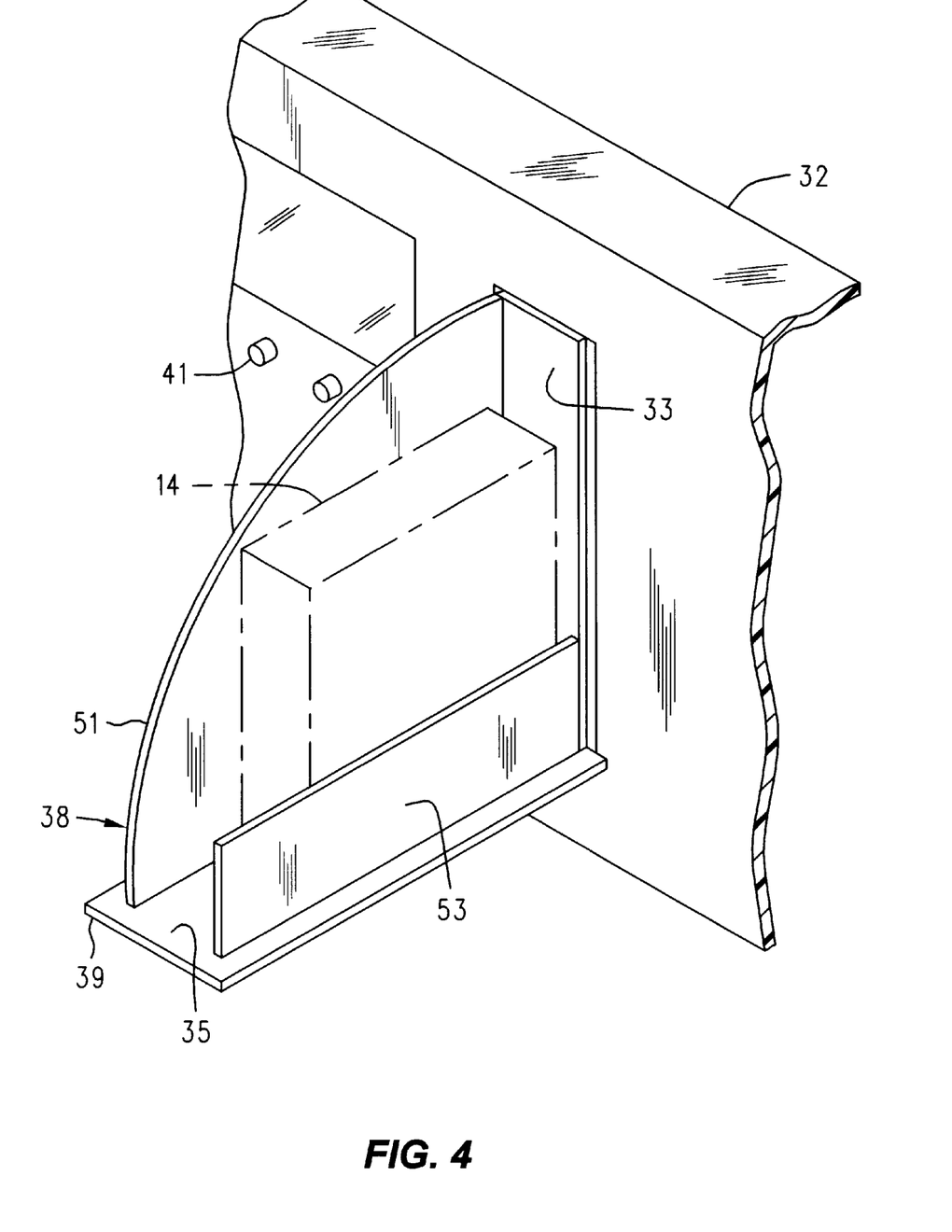
FIG. 4 is an enlarged perspective view of a portion of the front panel showing the cartridge exchange door in the opened position.

Regardless of whether the cartridge exchange door 38 is in the closed position 37 or the opened position 39, the jukebox data storage system 12 may remain operable and the cartridge engaging assembly or picker 16 may continue to access the data storage cartridges 14 remaining in the various cartridge receiving devices 20. However, the cartridge engaging assembly 16 will not be capable of accessing a data cartridge 14 contained in the door 38 when the door 38 is in the opened position 39, as shown in FIGS. 3 and 4.

When the system operator no longer needs access to the data cartridge 14, the system operator may insert the data cartridge 14 in the cartridge exchange door 38 and move the same to the closed position 37 (FIGS. 1 and 2). Thereafter, the cartridge engaging assembly or picker 16 may retrieve the data cartridge 14 contained in the cartridge exchange door 38 and return it to the appropriate cartridge receiving device 20, i.e., a cartridge magazine 22 or a cartridge read/write device 24, as the case may be.

It should be noted that any of the data cartridges 14 contained within the jukebox data storage system 12 may be accessed via the data cartridge exchange apparatus 10 according to the present invention. For example, a data cartridge 14 stored in any of the cartridge receiving devices 20 may be accessed by instructing the cartridge engaging assembly 16 to move the selected data cartridge 14 to the cartridge exchange door 38. After the selected data cartridge 14 has been loaded into the cartridge exchange door 38, the system operator may then access the recently transferred data cartridge 14 by simply opening the cartridge exchange door 38 in the manner already described.

A significant advantage associated with the data cartridge exchange apparatus 10 is that it provides easy and convenient access to the data cartridges 14 contained within the jukebox data storage system 12, but without the need to remove a panel or panels on the data storage system to manually access the cartridges stored therein. The invention also dispenses with the need to provide a separate data cartridge transport mechanism or a sliding drawer to present the desired data cartridge to the system operator. Yet another advantage associated with the data cartridge exchange apparatus 10 is that it also allows the data cartridges 14 to be accessed without the need to suspend the operation of the jukebox data storage system 12 during those times in which a system operator is accessing a data cartridge 14 contained within the cartridge exchange door 38.

Having briefly described the data cartridge exchange apparatus 10, as well as some of its more significant features and advantages, the various embodiments of the data cartridge exchange apparatus according to the present invention will now be described in detail. However, before proceeding with the description, it should be noted that the data cartridge exchange apparatus 10 according to the present invention may be utilized in any of a wide range of data storage systems now known or that may be developed in the future for storing and accessing one or more data cartridges contained therein. Accordingly, the present invention should not be regarded as limited to the particular jukebox data storage system 12 shown and described herein. It should also be noted that while the data cartridge exchange apparatus 10 is shown and described herein as it could be used to store and retrieve at least one DLT (digital linear tape) data cartridge 14 having a standard size and configuration, it is not limited to any particular type or style of data cartridge. Indeed, the data cartridge exchange apparatus 10 according to the present invention could be used with any type of data storage device comprising any type of data storage medium (e.g., magnetic disk or tape, optical disk, etc.). Consequently, the present invention should not be regarded as limited to use with the DLT type of data cartridge 14 shown and described herein.

With the foregoing considerations in mind, one embodiment of a data cartridge exchange apparatus 10 is shown in FIG. 1 as it may be used in a jukebox data storage system 12 of the type used to store and access large amounts of data contained on one or more data cartridges 14. The jukebox data storage system 12 may be provided with a cartridge engaging assembly or picker 16 that may be mounted to a guide frame or chassis assembly 18 to allow the cartridge engaging assembly 16 to transport data cartridges 14 contained within the jukebox data storage system 12. The various data cartridges 14 may be contained in one or more cartridge receiving devices 20, such as one or more cartridge storage magazines 22 and one or more cartridge read/write devices 24. In the embodiment shown and described herein, the various cartridge receiving devices 20 (e.g., the cartridge storage magazines 22 and the cartridge read/write devices 24), may be positioned at various locations within the jukebox data storage system 12 so that they define a generally U-shaped configuration, as best seen in FIG. 1. Alternatively, other configurations are possible, as will be explained in greater detail below.

By way of example, the jukebox data storage system 12 utilized in one preferred embodiment may comprise a data storage system that is similar to the type shown and described in U.S. Pat. No. 6,025,972, entitled "Multi-Plane Translating Cartridge Handling System" filed on Feb. 15, 2000, and which is incorporated herein by reference for all that it discloses. Alternatively, the data cartridge exchange apparatus 10 may be utilized in other types of data storage systems now known or that may be developed in the future as would be obvious to persons having ordinary skill in the art after having become familiar with the teachings of the present invention.

The jukebox data storage system 12 disclosed in U.S. Pat. No. 6,025,972 referred to above and that may be used in one preferred embodiment of the present invention (with certain modifications, as will be pointed out below) may comprise a generally rectangularly shaped guide frame or chassis assembly 18 having a pair of opposed side portions 26 and 28, as well as a rear end portion 30 and a front end portion 36. The various cartridge receiving devices 20 (e.g., the cartridge magazines 22 and the cartridge read/write devices 24) may be mounted around the rectangular guide frame or chassis assembly 18 so that they define a generally U-shaped configuration. For example, in the embodiment shown and described herein, the cartridge magazines 22 may be mounted at positions adjacent either opposed side portion 26, 28 of the guide frame 18, whereas the cartridge read/write devices 24 may be mounted at positions adjacent the rear end portion 30 of guide frame 18. Alternatively, the various cartridge receiving devices 20 may be arranged in other configurations, as would be obvious to persons having ordinary skill in the art. Consequently, the present invention should not be regarded as limited to the particular arrangement and configuration of the cartridge receiving devices 20 shown and described herein.

Referring now to FIGS. 1–4, the data cartridge exchange apparatus 10 may also be provided with a front panel member 32 having a cartridge exchange aperture 34 (FIG. 4) provided therein so that the cartridge exchange aperture 34 is positioned adjacent the front end portion 36 of guide frame 18. See FIG. 1. The cartridge exchange aperture 34 may be covered by a cartridge exchange door 38 which, in one preferred embodiment, may be provided with a pair of cartridge support surfaces 33 and 35 that are substantially perpendicular to one another. See FIG. 4. A pair of side panel members 51 and 53 may be provided that extend between the two cartridge support surfaces 33 and 35. The arrangement of the cartridge support surfaces 33, 35 and side panel members 51, 53 is such that a data cartridge 14 may be contained therebetween, as best seen in FIGS. 3 and 4.

The cartridge exchange door 38 may be pivotally mounted to the front panel 32 so that the cartridge exchange door 38 may be moved between the closed position 37 (shown in FIGS. 1 and 2) and the opened position 39 (illustrated in FIGS. 3 and 4). It is generally preferred, but not required, that the door 38 be provided with a suitable spring member (not shown) to bias the door 38 in the closed position 37. When the door 38 is in the closed position 37, the cartridge support surface 33 will be contained within the interior of the jukebox data storage system 12 and will be substantially horizontal. See, for example, FIG. 1. The horizontal position of the cartridge support surface 33 when the cartridge exchange door 38 is in the closed position 37 allows the cartridge exchange door 38 to receive and hold a data cartridge 14. When the door 38 is moved to the opened position 39, the cartridge support surface 35 will move to a horizontal position exterior to the jukebox data storage system 12. This condition is illustrated in FIGS. 3 and 4. Accordingly, a data cartridge 14 contained in the closed door 38 may be withdrawn from the jukebox data storage system 12 by simply moving the cartridge exchange door 38 from the closed position 37 to the opened position 39. The data cartridge 14 thereafter may be removed from the cartridge exchange door 38.

Figure 6:
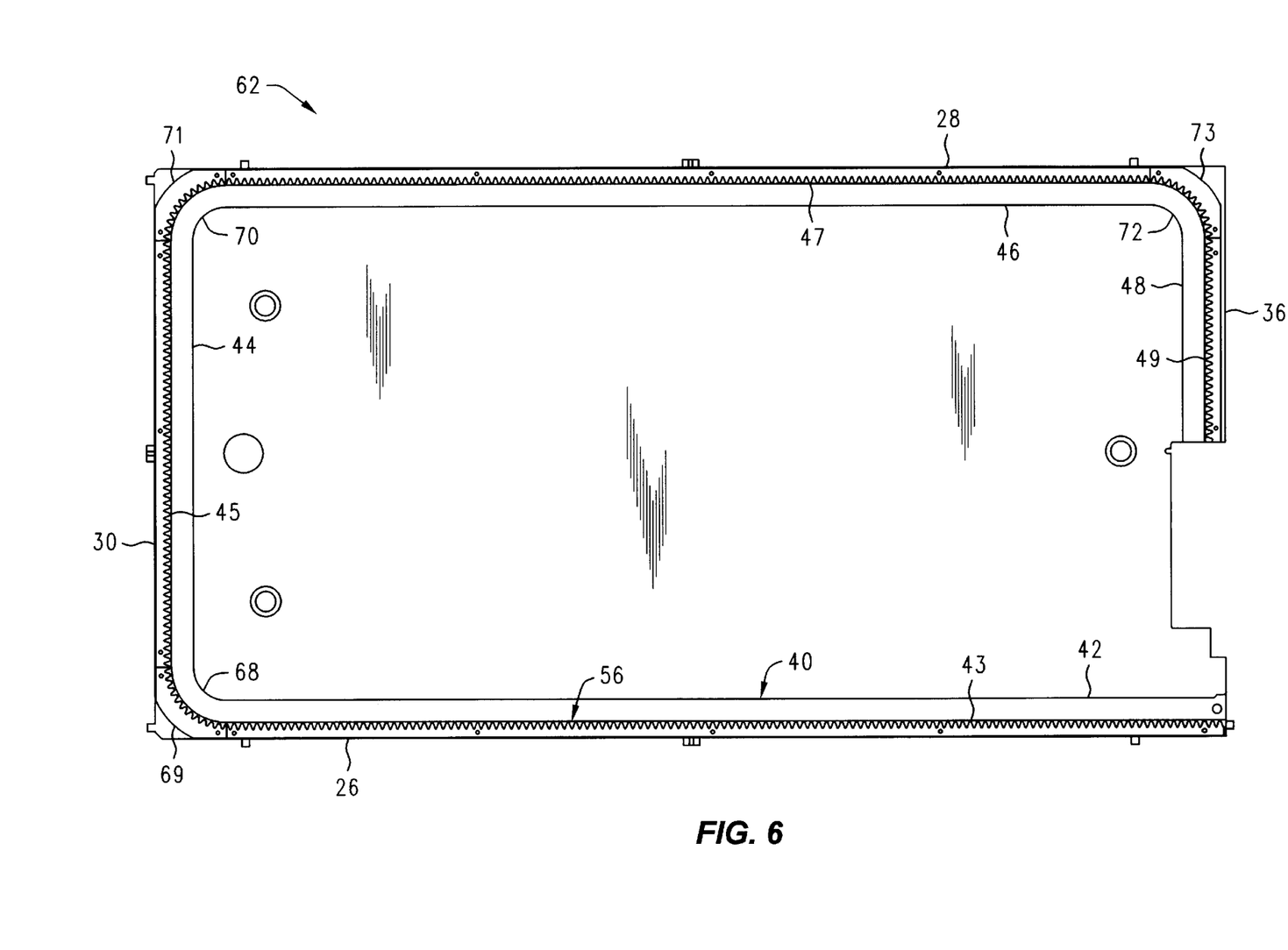
FIG. 6 is a plan view of the lower plate of the guide frame assembly showing the lower guide member and lower gear rack.

Referring now to FIGS. 5 and 6, the guide frame or chassis assembly 18 utilized in one preferred embodiment may comprise a lower plate 62, an upper plate 64, and a support structure 66. The support structure 66 holds or positions the lower plate 62 and the upper plate 64 in generally parallel, spaced-apart relation, as best seen in FIG. 5. The guide frame 18 defines the sides 26 and 28, as well as the front and rear ends 36 and 30. The sides 26 and 28 and front and rear ends 36 and 30 may be referred to herein in the alternative as "cartridge access sides" since the cartridge engaging assembly 16 may access cartridges positioned adjacent the sides 26, 28, 30, and 36. In the embodiment shown and described herein, the rectangular configuration of the guide frame or chassis 18 defines an arrangement wherein the sides 26 and 28 are positioned in spaced-apart relation and wherein the ends 30 and 36 are also positioned in spaced-apart relation, but are also generally perpendicular to the cartridge access sides 26 and 28. Accordingly, the guide frame 18 defines a generally rectangular configuration about which the various cartridge receiving devices 20 may be arranged. See FIG. 1. Alternatively, however, the various cartridge access sides 26, 28, 30, and 36 could be arranged in other configurations.

For example, instead of being positioned at substantially right angles to one another, the various cartridge access sides 26, 28, 30, and 36 could be positioned so that they form oblique (i.e., non-perpendicular) angles with respect to one another, such as would be the case if the guide frame 18 comprised a pentagonal (5-sided) or a hexagonal (6-sided) configuration. In still another alternative arrangement, the cartridge access sides 26, 28, 30, and 36 need not comprise straight segments or portions, but could instead comprise curved segments or portions, such as may be the case if the guide frame assembly 18 were provided with a circular or semicircular form. Consequently, the present invention should not be regarded as limited to a guide frame assembly 18 having the generally rectangular configuration shown and described herein.

The lower plate 62 is best seen in FIG. 6 and may comprise a plate-like, generally rectangular member that includes a lower guide member or channel 40 therein. The lower guide member or channel 40 may comprise respective first, second, and third working branch sections 42, 44, and 46 that are located adjacent the respective sides 26, 30, and 28. The lower guide member or channel 40 may also include an exchange branch section 48 located adjacent front end 36. The second working branch section 44 may be joined to the first and third working branch sections 42 and 46 by respective rounded corner sections 68 and 70. Similarly, the exchange branch section 48 may be joined to the third working branch section 46 by a rounded corner section 72. Accordingly, the lower guide member or channel 40 defines a substantially contiguous displacement path 50 having a working branch (defined by the first, second, and third working branch sections 42, 44, and 46) and an exchange branch (defined by the exchange branch section 48).

The upper plate 64 may be essentially identical to the lower plate 62 just described and may comprise a plate-like, generally rectangular member having an upper guide member or channel 40' provided therein. See FIG. 5. The upper guide member or channel 40' may include first, second, and third working branch sections (not shown) that are located adjacent the sides 26, 30, and 28 of the guide frame assembly 18. The upper guide member or channel 40' may also be provided with an exchange branch section (also not shown) positioned adjacent the front end 36 of guide frame assembly 18. The first, second, and third working branch sections, as well as the exchange branch section, may be connected together by respective rounded corner sections (not shown) in a manner essentially identical to those of the lower guide member 40 in the lower plate 62.

The lower and upper plates 62 and 64 may be made from any of a wide range of materials, such as metals or plastics, suitable for the intended application. By way of example, in one preferred embodiment, the lower and upper plates 62 and 64 are molded as single pieces from a polycarbonate plastic material, although other materials could also be used. The lower and upper guide members 40 and 40' formed within the lower and upper plates 62 and 64 may have any of a wide range of widths and depths suitable for the intended application. In one preferred embodiment, both lower and upper guide members or channels 40 and 40' have widths of about 7.16 mm and depths of about 6.0 mm.

The support structure 66 for holding the lower and upper plates 62 and 64 in essentially parallel, spaced-apart relation may be made from any of a wide range of materials, such as metals or plastics, suitable for the intended application. In one preferred embodiment, the support structure 66 is fabricated from sheet metal and may be secured to the lower and upper plates 62 and 64 by any convenient fastener system or device (e.g., screws) well-known in the art.

The cartridge engaging device or "picker" 16 is best seen in FIG. 5 and may comprise apparatus suitable for loading and retrieving the data cartridges 14 to and from the particular cartridge receiving device 20 (e.g., the cartridge magazine 22 or cartridge read/write device 24) in which the data cartridge 14 is held. An example of a cartridge engaging device or "picker" 16 suitable for use in the present invention is shown and described in U.S. Pat. No. 6,160,786, entitled "Cartridge Engaging Assembly with Rack Drive Thumb Actuator System," issued on Dec. 12, 2000, which is incorporated herein by reference for all that it discloses. Alternatively, other cartridge engaging assemblies that may be suitable for use in the present invention are disclosed in the following U.S. patents which are specifically incorporated by reference herein for all that they disclose: U.S. Pat. No. 4,998,232 entitled "Optical Disk Handling Apparatus with Flip Latch;" U.S. Pat. No. 5,010,536 entitled "Cartridge Handling System;"U.S. Pat. No. 5,014,255 entitled "Optical Disk Cartridge Handling Apparatus with Passive Cartridge Engagement Assembly;" and U.S. Pat. No. 5,043,962 entitled "Cartridge Handling System." Since such cartridge engaging devices or "pickers" are well-known in the art and since the details of such devices are not necessary to understand or practice the present invention, the particular cartridge engaging device utilized in one preferred embodiment of the present invention will not be described in further detail herein.

Figure 7:
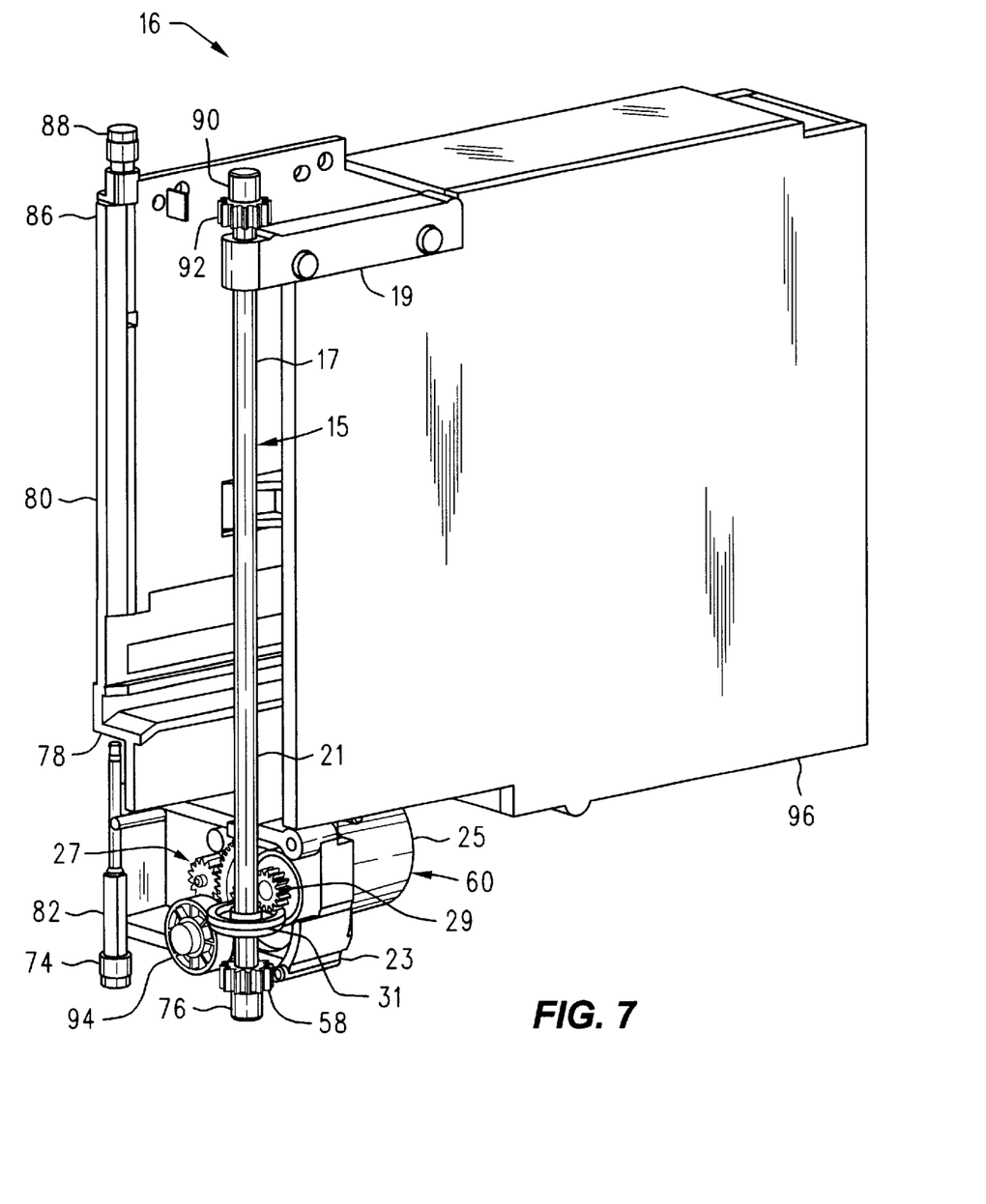
FIG. 7 is a perspective view of the cartridge engaging assembly shown in FIG. 5.

Regardless of the particular type or style of cartridge engaging assembly 16 that is used, the cartridge engaging assembly 16 may be mounted to the lower and upper U-shaped guide members 40 and 40' of guide frame 18 so that the cartridge engaging assembly 16 may be moved along the various cartridge access sides 26, 30, 28, and 36, generally following the displacement path 50. See FIG. 1. Referring now to FIG. 7, the cartridge engaging assembly 16 may be mounted to the lower guide member or channel 40 by a pair of lower bushing members 74 and 76 that extend from the bottom 78 of the cartridge access end 80 of the cartridge engaging assembly 16. In one preferred embodiment, the lower bushing member 74 may be attached to a shaft 82 that may be mounted to the gear case cover (not shown) for the gear case housing 23. Alternatively, other mounting arrangements could be used to attach the lower bushing member 74 to the cartridge engaging assembly 16, as would be obvious to persons having ordinary skill in the art. The lower bushing member 76 may be attached to the end of the lower pinion 58, in the manner best seen in FIG. 7, or may even comprise an integral portion of the lower pinion 54.

The top end 86 of the cartridge engaging assembly 16 may be provided with a pair of upper bushing members 88 and 90 that are sized to be slidably received in the upper guide member or channel 40'. The upper bushing 88 may be mounted to the top end 86 of the cartridge access end 80 of cartridge engaging assembly 16. The upper bushing 90 may be mounted to the end of an upper pinion 92, or may even comprise an integral portion of the upper pinion 92. The lower and upper bushings 74, 76, 88, and 90 guide the cartridge engaging assembly 16 along the lower and upper guide members 40 and 40' associated with the lower and upper plates 62 and 64. The bottom end 78 of cartridge engaging assembly 16 may be provided with a guide wheel 94 which contacts the lower plate 62 and supports the weight of the cartridge engaging assembly 16. Optionally, the distal end 96 of the cartridge engaging assembly 16 also may be provided with a similar wheel arrangement (not shown) to support the distal end 96 of the cartridge engaging assembly 16.

The lower and upper bushing members 74, 76, 88, and 90 may be made from any of a wide range of materials, such as metals or plastics (e.g., brass or nylon), suitable for providing a low friction engagement with the respective lower and upper guide members or channels 40 and 40' in the respective lower and upper plates 62 and 64. In one preferred embodiment, the lower and upper bushing members 74, 76, 88, and 90 are made from nylon and have diameters of about 7.01 mm which provides 0.15 mm of clearance between the bushing members and the guide channels, which, as mentioned above, have widths of about 7.16 mm.

As was briefly described above, the cartridge engaging assembly 16 may be moved along the lower and upper guide members 40 and 40' by an actuator system 54, as best seen in FIG. 5. In one preferred embodiment, the actuator system 54 may comprise a rack and pinion drive system having a substantially continuous lower gear rack 56 provided on the lower plate 62 of guide frame 18 at a position adjacent the lower guide member or channel 40. Similarly, a substantially continuous upper gear rack 56' (FIG. 5) may be provided on the upper plate 64 of guide frame 18 at a position adjacent the upper guide member or channel 40'. The lower and upper drive pinions 58 and 92 (FIG. 7) mounted to the cartridge engaging assembly 16 are sized and positioned to engage the respective lower and upper gear racks 56 and 56'. The pinion drive assembly 60 mounted to the cartridge engaging assembly 16 rotates the lower and upper pinion gears 58 and 92 to move the cartridge engaging assembly 16 back and fourth along the displacement path 50, as best seen in FIG. 1.

Referring now specifically to FIG. 6, the lower gear rack 56 may comprise first, second, and third elongate working branches or sections 43, 45, and 47 that are provided on the lower plate 62 adjacent the first, second, and third working branch sections 42, 44, and 46 of the lower guide member 40. An exchange branch or section 49 may be provided on the lower plate 62 at a position adjacent the exchange branch section 48 of lower guide member 40. The second working branch or section 45 of lower gear rack 56 may be joined to the first and third working branches 43 and 47 of lower gear rack 56 by respective rounded corner sections 69 and 71, as best seen in FIG. 6. Similarly, the exchange branch or section 49 may be joined to the third working branch 47 by a rounded corner section 73. The lower gear rack 56 may therefore comprise a substantially continuous member that extends along substantially the entirety of the lower guide member or channel 40, again as best seen in FIG. 6.

The upper gear rack 56' is essentially identical to the lower gear rack 56 just described and may include first, second, and third working branch sections (not shown) that are provided on the upper plate 64 at positions adjacent the respective first, second, and third working branch sections (not shown) of the upper guide member or channel 40'. An exchange branch section 49' (FIG. 5) may be provided on the upper plate 64 at a position adjacent the exchange branch section (not shown) of upper guide member 40'. The first, second, and third working branch sections (not shown) of upper gear rack 56' may be connected together by respective rounded corner sections (not shown) in the manner already described for the lower gear rack 56. Similarly, the exchange branch section 49' of upper gear rack 56' may be connected to the third working branch section (not shown) of upper gear rack 56' by a rounded corner section 73', as best seen in FIG. 5. In accordance with the foregoing arrangement, then, the upper gear rack 56' may therefore comprise a substantially continuous member that extends along substantially the entirety of the upper guide member or channel 40'.

The lower and upper gear racks 56 and 56' may be made from any of a wide variety of materials, such as metals or plastics, suitable for the intended application. By way of example, in one preferred embodiment wherein the lower and upper plates 62 and 64 are molded from a polycarbonate plastic material, the lower and upper gear racks 56 and 56' are provided as integrally molded portions of the lower and upper plates 62 and 64 (i.e., the lower and upper gear racks 56 and 56' comprise the same polycarbonate plastic material). Alternatively, the lower and upper gear racks 56 and 56' may comprise separate components that may be fixedly attached to the lower and upper plates 62 and 64 by any of a wide range of fastening systems or devices (e.g., adhesives, screws, rivets, etc.) well-known in the art and that are readily commercially available.

The lower and upper gear racks 56 and 56' may be provided with any convenient tooth pitch suitable for the intended application. In one preferred embodiment, the lower and upper gear racks 56 and 56' may have a tooth pitch of about 32 (teeth/inch), although other tooth pitches may also be used.

Referring again to FIG. 7, the lower and upper pinion gears 58 and 92 of cartridge engaging assembly 16 are sized and positioned to engage the lower and upper gear racks 56 and 56', respectively. In the embodiment shown and described herein, the lower and upper pinion gears 58 and 92 are mounted to a drive shaft assembly 15 which may be journalled for rotation in the cartridge engaging assembly 16. By way of example, in one preferred embodiment, the upper end 17 of drive shaft assembly 15 is journalled for rotation in an upper bearing member 19. The lower end 21 of drive shaft 15 may be journalled for rotation in the gear case cover (not shown) for gear case housing 23. Alternatively, other mounting arrangements are possible, as would be obvious to persons having ordinary skill in the art.

The lower and upper drive pinions 58 and 92 are driven by the pinion drive assembly 60 that may be mounted to the cartridge engaging assembly 16. The pinion drive assembly 60 may comprise a motor 25 and a reduction gear assembly 27 mounted within gearbox housing 23. The reduction gear assembly 27 may comprise one or more spur gears for reducing the speed of the motor 25. The drive shaft assembly 15 may be operatively connected to the output pinion 29 of reduction gear assembly 27 by a face gear 31. Alternatively, other types of right angle gear arrangements may be used.

In one preferred embodiment, the reduction gear assembly 27 may be provided with a encoder system (not shown) to monitor the angular position of a selected gear in the reduction gear assembly 27. The angular position of the selected gear provided by the encoder system (not shown) may be used by the control system (not shown) to derive information about the position, velocity, and acceleration of the cartridge engaging assembly 16. However, since such encoder systems are well-known in the art and could be easily provided by persons having ordinary skill in the art after having become familiar with the teachings of the present invention, the particular encoder system utilized in one preferred embodiment of the present invention will not be described in further detail.

The reduction gear assembly 27 may comprise any of a wide variety of gear reduction systems, such as spur gear reduction systems, well-known in the art. Alternatively, a worm gear reduction system (not shown) could also be used. The motor 25 may comprise a permanent magnet d.c. motor, such as type RS-385PH, available from Mabuchi Motor Corp. of China. Alternatively, other types of motors may be provided. Of course, the characteristics of the particular type of motor that is selected will determine the reduction ratio that is provided by the reduction gear assembly 27. In one preferred embodiment, the reduction gear assembly 27 provides a reduction ratio of about 12:1, although other reduction ratios may be used.

In an alternative embodiment, other types of actuator systems 54 may be used to move the cartridge engaging assembly 16 along the lower and upper guide members or channels 40 and 40'. For example, a chain or belt drive arrangement could be used to connect the motor 25 and the cartridge engaging assembly 16 to move the cartridge engaging assembly 16 along the lower and upper guide members or channels 40 and 40'. In yet another arrangement, a wire rope or "cable" and pulley arrangement may be used to connect the cartridge engaging assembly 16 to the motor 25.

As was mentioned above, the jukebox data storage system 12 may be provided with a control system (not shown) suitable for controlling, among other things, the actuator system 54 associated with the cartridge engaging assembly 16. For example, such a control system would operate the actuator system 54 to move the cartridge engaging assembly 16 along the displacement path 50 (FIG. 1) so that the cartridge engaging assembly 16 may access the desired data cartridge 14 from the cartridge receiving devices 20 (e.g., either the cartridge magazine 22 or the cartridge read/write device 24, as the case may be). However, since such control systems are well-known in the art and could be readily provided by persons having ordinary skill in the art, the particular control system used to control the operation of the actuator system 54 will not be described in further detail herein.

The data cartridge exchange apparatus 10 may be operated as follows to allow the system operator (not shown) to access a data cartridge 14 contained within the jukebox data storage system 12. Consider, for example, a situation wherein the data storage system 12 has been provided with a plurality of data cartridges 14. During normal operation, the door 38 may remain in the fully closed position 37 (FIGS. 1 and 2), and the cartridge engaging assembly 16 contained within the jukebox data storage system 12 may access all of the data cartridges 14 contained therein. If the need arises for the system operator to access a data cartridge, such as, for example, to remove the data cartridge 14 and replace it with a substitute data cartridge (not shown), the system operator may instruct the jukebox data storage system 12 to place the desired data cartridge 14 in the cartridge exchange door 38. The jukebox data storage system 12 may be so instructed via the host computer system (not shown) connected to the jukebox data storage system 12. Alternatively, the instructions may be provided via a control panel 41 (FIG. 2) provided on the front panel 32 of the jukebox data storage system.

Once the jukebox data storage system 12 has been properly instructed, the control system (not shown) associated with the data storage system 12 would operate the cartridge engaging assembly 16 as required to retrieve the selected data cartridge 14 from the cartridge receiving device 20 and to carry the selected data cartridge 14 to the cartridge exchange door 38. More specifically, the picker actuator system 54 will move the picker 16 along the displacement path 50 until the picker 16 is positioned adjacent the cartridge receiving device 20 that contains the selected data cartridge 14. The picker 16 will then remove the selected data cartridge 14 from the cartridge receiving device 20. The picker actuator system 54 will then move the picker 16 along the displacement path 50 until the picker is positioned opposite the cartridge exchange door 38. That is, the picker 16 will be located substantially at the position 52''' shown in FIG. 1.

Once properly positioned adjacent the cartridge exchange door 38, the cartridge engaging assembly 16 will eject the data cartridge 14, whereupon it will be received and held by the cartridge support surface 33 of the cartridge exchange door 38. Thereafter, the system operator may open the cartridge exchange door 38 to expose the data cartridge 14, allowing the same to be removed and/or replaced with a substitute data cartridge (not shown). See FIGS. 3 and 4.

Regardless of whether the cartridge exchange door 38 is in the closed position 37 or the opened position 39, the jukebox data storage system 12 may remain operable and the cartridge engaging assembly 16 may continue to access the data storage cartridges 14 remaining in the various cartridge receiving devices 20. However, the cartridge engaging assembly 16 will not be capable of accessing a data cartridge 14 contained in the door 38 when the door 38 is in the opened position 39, as shown in FIGS. 3 and 4.

When the system operator no longer needs access to the selected data cartridge 14, he or she may insert the data cartridge 14 in the door 38 and move the same to the closed position 37 (FIGS. 1 and 2). Thereafter, the control system (not shown) associated with the jukebox data storage system 12 may operate the cartridge engaging assembly or picker 16 as necessary to retrieve the data cartridge 14 from the closed cartridge exchange door 38 and return the cartridge 14 to the appropriate cartridge receiving device 20, e.g., a cartridge magazine 22 or a cartridge read/write device 24, as the case may be.

As was mentioned above, it should be noted that any of the data cartridges 14 contained within the jukebox data storage system 12 may be accessed via the data cartridge exchange apparatus 10 according to the present invention. For example, a data cartridge 14 stored in any of the cartridge receiving devices 20 may be accessed by instructing the cartridge engaging assembly 16 to move the selected data cartridge 14 to the cartridge exchange door 38. After the selected data cartridge 14 has been loaded into the cartridge exchange door 38, the system operator may then access the recently transferred data cartridge 14 by simply opening the cartridge access door 38 in the manner already described.

It is contemplated that the inventive concepts herein described may be variously otherwise embodied and it is intended that the appended claims be construed to include alternative embodiments of the invention except insofar as limited by the prior art.

What is claimed is:

1. Data cartridge exchange apparatus for allowing a user to access a data cartridge contained in a data storage system, comprising:

a cartridge engaging assembly mounted within the data storage system, said cartridge engaging assembly being moveable along a displacement path, said displacement path having a working branch and an exchange branch, said working branch comprising a first working branch section, a second working branch section contiguous to said first working branch section, and a third working branch section contiguous to said second working branch section, said first, second, and third working branch sections defining a substantially U-shaped configuration, said exchange branch of said displacement path being contiguous with said working branch; and a panel located adjacent a portion of said exchange branch, said panel having a cartridge exchange aperture therein sized to pass the data cartridge.

2. The data cartridge exchange apparatus of claim 1, wherein said data cartridge exchange aperture extends from an interior region of the data storage system to an exterior region of the data storage system so that the data cartridge may be passed directly from the interior region to the exterior region.

3. The data cartridge exchange apparatus of claim 2, wherein said panel comprises a front panel of the data storage system.

4. The data cartridge exchange apparatus of claim 2, further comprising a door mounted to said panel, said door being moveable between a closed position and an open position, said door substantially occluding said cartridge exchange aperture when said door is in the closed position.

5. The data cartridge exchange apparatus of claim 1 wherein said cartridge engaging assembly is mounted to a guide member that allows said cartridge engaging assembly to follow said displacement path.

6. The data cartridge exchange apparatus of claim 5, wherein said guide member comprises a base plate having an elongate slot therein and wherein said cartridge engaging assembly includes an actuator for moving said cartridge engaging assembly along said elongate slot.

7. The data cartridge exchange apparatus of claim 6 further comprising an elongate gear rack positioned adjacent said elongate slot in said base plate and wherein said actuator includes a pinion gear sized to engage said gear rack.

8. Data cartridge exchange apparatus for allowing a user to access a data cartridge contained in a data storage system, comprising:

a cartridge engaging assembly mounted within the data storage system, said cartridge engaging assembly being moveable along a displacement path, said displacement path comprising a working branch and an exchange branch, wherein said working branch comprises a substantially U-shaped configuration having a first working branch section, a second working branch section contiguous to said first working branch section and substantially perpendicular to said first working branch section, and a third working branch section contiguous to said second working branch section and substantially perpendicular to said second working branch section so that said third working branch section is substantially parallel to said first working branch section, and wherein said exchange branch is contiguous to said third working branch section and substantially perpendicular to said third working branch section so that said exchange branch is substantially parallel to said second working branch section;

a panel located adjacent a portion of said exchange branch, said panel having a cartridge exchange aperture therein sized to pass the data cartridge, said cartridge exchange aperture extending from an interior region of the data storage system to an exterior region of the data storage system so that the data cartridge may be passed directly from the interior region to the exterior region; and a door mounted to said panel, said door being moveable between a closed position and an open position, said door substantially occluding said cartridge exchange aperture when said door is in the closed position.

9. Data cartridge exchange apparatus for allowing a user to access a data cartridge contained in a data storage system, comprising:

a base plate having an elongate slot therein, wherein said elongate slot comprises a substantially U-shaped member having a first elongate section, a second elongate section contiguous to said first elongate section and substantially perpendicular to said first elongate section, a third elongate section contiguous to said second elongate section and substantially perpendicular to said second elongate section so that said third elongate section is substantially parallel to said first elongate section, and a fourth section contiguous to said third elongate section and substantially perpendicular to said third elongate section so that said fourth section is substantially parallel to said second elongate section;

an elongate gear rack mounted to said base plate so that said elongate gear rack is positioned adjacent said elongate slot;

a cartridge engaging assembly mounted within said elongate slot in said base plate so that said cartridge engaging assembly is moveable along a displacement path;

an actuator operatively associated with said cartridge engaging assembly, said actuator including a pinion gear sized to engage said elongate gear rack, said actuator moving said cartridge engaging assembly along said elongate slot; and a panel located adjacent a portion of said displacement path, said panel having a cartridge exchange aperture therein sized to pass the data cartridge.

10. The data cartridge exchange apparatus of claim 9, wherein said cartridge exchange aperture is positioned adjacent said fourth section.

11. The data cartridge exchange apparatus of claim 10, wherein said cartridge exchange aperture extends from an interior region of the data storage system to an exterior region of the data storage system so that the data cartridge may be passed directly from the interior region to the exterior region.

12. The data cartridge exchange apparatus of claim 11, wherein said panel comprises a front panel of the data storage system.

13. The data cartridge exchange apparatus of claim 11, further comprising a door mounted to said panel, said door being moveable between a closed position and an open position, said door substantially occluding said cartridge exchange aperture when said door is in the closed position.

14. Data cartridge exchange apparatus for allowing a user to access a data cartridge contained in a data storage system, comprising:

cartridge engaging means mounted within the data storage system for releasably engaging the data cartridge and for moving the data cartridge along a displacement path, said displacement path having a working branch and an exchange branch, said working branch comprising a first working branch section, a second working branch section contiguous to said first working branch section, and a third working branch section contiguous to said second working branch section, said first, second, and third working branch sections defining a substantially U-shaped configuration, said exchange branch of said displacement path being contiguous with said working branch; and cartridge exchange panel means located adjacent a portion of said exchange branch for allowing the data cartridge to be passed therethrough.

15. Data cartridge exchange apparatus for allowing a user to access a data cartridge contained in a data storage system, comprising:

cartridge engaging means mounted within the data storage system for releasably engaging the data cartridge and for moving the data cartridge along a displacement path, said displacement path comprising a working branch and an exchange branch, wherein said working branch comprises a substantially U-shaped configuration having a first working branch section, a second working branch section contiguous to said first working branch section and substantially perpendicular to said first working branch section, and a third working branch section contiguous to said second working branch section and substantially perpendicular to said second working branch section so that said third working branch section is substantially parallel to said first working branch section, and wherein said exchange branch is contiguous to said third working branch section and substantially perpendicular to said third working branch section so that said exchange branch is substantially parallel to said second working branch section; and cartridge exchange panel means located adjacent a portion of said exchange branch for allowing the data cartridge to be passed therethrough.

16. A method for accessing at least one data cartridge contained in a data storage system, comprising:

providing the data storage system with a cartridge engaging assembly that is moveable along a displacement path, said displacement path having a working branch and an exchange branch, said working branch comprising a first working branch section, a second working branch section contiguous to said first working branch section, and a third working branch section contiguous to said second working branch section, said first, second, and third working branch sections defining a substantially U-shaped configuration, said exchange branch of said displacement path being contiguous with said working branch, and a panel located adjacent a portion of the exchange branch, the panel having a cartridge exchange aperture therein sized to pass the data cartridge;

moving the cartridge engaging assembly adjacent the cartridge exchange aperture;

ejecting the data cartridge from the cartridge exchanging assembly; and removing the ejected data cartridge via the cartridge exchange aperture.

17. A method for accessing at least one data cartridge contained in a data storage system, comprising:

providing the data storage system with a cartridge engaging assembly that is moveable along a displacement path, said displacement path having a working branch and an exchange branch, said working branch comprising a first working branch section, a second working branch section contiguous to said first working branch section, and a third working branch section contiguous to said second working branch section, said first, second, and third working branch sections defining a substantially U-shaped configuration, said exchange branch of said displacement path being contiguous with said working branch, and a panel located adjacent a portion of the exchange branch, the panel having a cartridge exchange aperture therein sized to pass the data cartridge;

inserting the data cartridge through the cartridge exchange aperture; and loading the data cartridge into the cartridge engaging assembly.

* * * * *